United States Patent [19]

Oakley et al.

[11] Patent Number: 5,141,529
[45] Date of Patent: Aug. 25, 1992

[54] DUST PRECIPITATION FROM AIR BY NEGATIVE IONIZATION

[75] Inventors: Clive C. Oakley, West Midlands, England; Reginald R. Robertson, Winnipeg, Canada

[73] Assignee: Neg-Ions (North America) Inc., Winnipeg, Canada

[21] Appl. No.: 544,524

[22] Filed: Jun. 28, 1990

[30] Foreign Application Priority Data

Jun. 19, 1990 [GB] United Kingdom ............ 9013621

[51] Int. Cl.⁵ ............................................. B03C 3/00
[52] U.S. Cl. .................................... 55/2; 55/385.2; 55/150; 361/230; 361/231
[58] Field of Search ............. 55/6, 2, 124, 126, 385.2, 55/150-153; 361/235, 226, 230-233

[56] References Cited

U.S. PATENT DOCUMENTS

| | | | |
|---|---|---|---|
| 3,973,927 | 8/1976 | Furchner et al. | 55/150 |
| 4,440,553 | 4/1984 | Helmus et al. | 55/126 |
| 4,484,249 | 11/1984 | Saurenman | 361/231 |
| 4,642,728 | 2/1987 | Unger | 361/231 |
| 4,757,421 | 7/1988 | Mykkanen | 361/231 |
| 4,980,796 | 12/1990 | Huggins | 55/151 |

Primary Examiner—Bernard Nozick
Attorney, Agent, or Firm—Adrian D. Battison; Stanley G. Ade; Murray E. Thrift

[57] ABSTRACT

A system for precipitating dust includes providing a screen arrangement either in the form of a ceiling with walls or in the form of a canopy with the screen being penetrable by air. Inside the screen and particularly adjacent edges of the screen or the canopy there are provided negative ion emitters positioned in rows so as to generate a curtain of ions precipitating the dust from the air onto the ground for collection. Within the screen can be defined either a clean zone or the screen can be used to confine a dust producing process so as to precipitate the dust immediately adjacent the process to prevent it spreading to other areas. Emitters are provided in the form of a carbon fiber yarn which projects outwardly through openings in a channel member with the yarn being doubled back upon itself in some cases to provide a highly directional emission.

12 Claims, 5 Drawing Sheets

DUST PRECIPITATION FROM AIR BY NEGATIVE IONIZATION

BACKGROUND OF THE INVENTION

This invention relates to a system for dust precipitation from air using negative ionization of the air.

The concept and prospective commercialization of negative ionization techniques has been around for decades with very little progress due to the lack of credibility arising from inappropriate, largely unsuccessful applications and clouded by exaggerated unsubstantiated claims.

At the same time the effectiveness of the technique suffered because the equipment to generate and distribute the required volumes of negative ions was initially bulky, expensive, requiring constant maintenance and was generally unreliable. These circumstances meant that the effectiveness of applications deteriorated rapidly and became totally suspect in operation.

The increasing employment of the technology is being brought about by some basic trends:

the development of equipment utilizing electronics and new materials which provide a safe, reliable, inexpensive, and non polluting source of negative ions and their distribution.

an increasing need to improve the air quality in enclosed environments which have been designed to minimize energy costs for heating, ventilating and air conditioning installations.

higher standards of safety and health in the workplace in regard to the control of micronic and submicronic pollutants identified as a health hazard.

zero defect objectives in manufacturing operations requiring more effective means to control the migration of fine dust and pollutants.

hard evidence of the effectiveness of industrial applications and increasing supportive scientific evidence as regards proper electro climate conditions for human comfort and working efficiency.

Off-shore countries, particularly Israel have maintained a fairly high level of research and development effort into pursuing the effectiveness of negative ionization techniques in a wide range of applications with considerable success.

Progress in North America in this respect, industrially at least, has been limited to the elimination of static electricity, but with strong indications of a recent revival of air treatment by modular, fan assisted negative ion dispersal units.

Conventional systems to obtain super clean air with filtration efficiencies in the micronic and sub-micronic ranges are capital intensive and expensive to run in terms of energy consumption and maintenance costs.

At the same time the systems while fully effective on the air circulated can have little influence to prevent small particulants and pollutants originating in the working plennum producing problems, apart from the inherent dilution refreshening process allowed by the cycle of air changes supplied to the area. An investigation into further prior art suggests that while the use of negative ionization techniques to improve air quality and contain dust pollution in a general way is gaining ground, there is little doubt that the level of technology available is relatively crude.

Ions are created in nature by sunlight, cosmic and terrestrial radiation and the friction of moving air and water that causes electrons to leave hydrogen, nitrogen and other molecules and to attach themselves to oxygen molecules.

Molecules with extra electrons from negative ions and have a positive effect on the environment. They neutralize odours and contribute to the clear air and the fresh smell we find in non-industrial, sparsely populated areas and at the seaside or healthy holiday resorts.

In the Prairie regions of Canada, the phenomenon best manifests itself by the invigoration experienced after a summer storm with lightning, which relieves the heavy depressing conditions which gradually build up periodically in such areas during the summer.

Positive ions are produced by car and factory exhausts, cigarette smoke, dust, soot, fumes from new processes and other domestic and industrial pollutants, attracted negative ground and are harmlessly discharged. But in the enclosed environments of modern society—metals, cars, builings lined and furbished with synethetic materials, etc., these pollutions cannot be discharged to earth.

At the same time the enveloping car bodies and building structures that keep the positive ions in, also keep the beneficial negative ions out because their electrical charges are absorbed by steel and concrete, bricks and siding material.

A controlled output of negative ions can be produced by electronic means/corona discharge and this source is an approved alternative for the Polonium Ionizers withdrawn from the market by 3M in Feb. 1988. The source generation of ozone is so low as to be almost immeasurable and well below the FDA maximum of 0.05 ppm.

SUMMARY OF THE INVENTION

It is one object of the present invention to provide an improved method for cleaning air within a building using the negative ionization principles in a unique manner to obtain air which is cleaned to a high degree with low capital and maintenance costs.

According to a first aspect of the invention, therefore, there is provided a method of precipitating particles from air within a building comprising defining a zone within the building at least partly partitioned from a remaining part of the building, separating the zone from the building by a screen which is perforated to allow transmission therethrough of air and light, and mounting within the zone a plurality of emitters of negatively charged air ions.

According to a second aspect of the invention, therefore, there is provided an emitter of negatively charged air ions for use in precipitating particles from air within a building comprising an elongate member defining a channel therealong and having a closed front surface, a conductor mounted in the channel member, means defining a plurality of openings in front surface through which portions of the conductor project, and connector means on the channel member for connecting a high voltage to the conductor such that the exposed portions of the conductor generate ions in air exposed to the conductor forwardly of the front face.

The provision of the elongate multiple emitter enables a high very degree of flexibility to be used in the location and mounting of the emitters for the negative ionization treatment so that the units can be installed very quickly and at low capital cost.

The use of the screen to separate the zone to be cleaned from the remainder of the building enables a system to be used known as a "clean-zone" or as an alternative a "reverse clean-zone" in which the major dust emitting process is mounted within the zone and the negative ionization treatment used to extract the dust from the air prior to its release to the remainder of the building.

The screen is preferably formed of a material which is permeable to air and light so that the zone can be mounted within the building without regard to the location of the ventilation units and provision of lighting. In many cases, therefore, the zone can be developed at an area leaving the ventilation systems and lighting systems outside of the zone so that there is no interference whatever with the existing utilities within the building. The light and air movement necessary for ventilation can then take place through the screen with the screen and the negative ionization system cooperating to extract the dust and to prevent its penetration through the screen.

The system as installed, constantly and efficiently will precipitate about 99% of the fine dust particles and pollutants in a work area defined and isolated by specially constructed barrier screens.

With the correctly calculated and distributed negative ion density within the zone, all further migration of the precipitation micronic and submicronic particles will be effectively and continuously prevented, as a result of the electro-climate created and maintained in the "Clean Zone" area.

The emitters are preferably separated from any air flow generating systems such as fans or air duct outlets so that the ions are freely emitted into the area to be cleaned wihtout passage of the ions or any air stream carrying the ions through a filter. Thus the particles are separated from the air by a precipitation technique which causes the particles to fall to the floor for collection by conventional house cleaning techniques.

The enclosure which acts as a cage to isolate and define the area/volume required for the application, is considered to be a basic and essential feature of the "clean zone" concept. The design, construction and materials employed, all contribute to ensuring the effectiveness of the system.

Installation of the "Clean Zone" enclosure is simple and flexible and easily fitted retro-actively with the minimum difficulty to accommodate existing equipment.

The light open nature of the enclosure gives little sense of restriction to employees inside the zone and it is generally unnecessary to upgrade lighting levels in the area after the installation of the zone.

The effectiveness of the system is readily measurable and can be demonstrated by the simple action of energizing and deenergizing the AC power input.

The results in regard to the control of fine dust, and reduction of inclusions are fully substantiated in practical cost effective terms by satisifed industrial end users in regard to:
reduced level of rejections due to inclusions;
increased productivity
improved working environment inside and outside the zone.

According to a third aspect of the invention, there is provided a method of cleaning particles from air within an area of a building comprising mounting emitters of negatively charged ions in the area of the building separate from any air flow arrangements for causing air flow within the area, causing the ions to engage particles in the area and to precipitate the particles downwardly onto a floor of the area and collecting the particles from the floor.

Preferably the method includes a canopy which assists in directing the particles away from a source of the particles e.g. a dust producing machine towards sides of the machine for precipitation on the floor.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
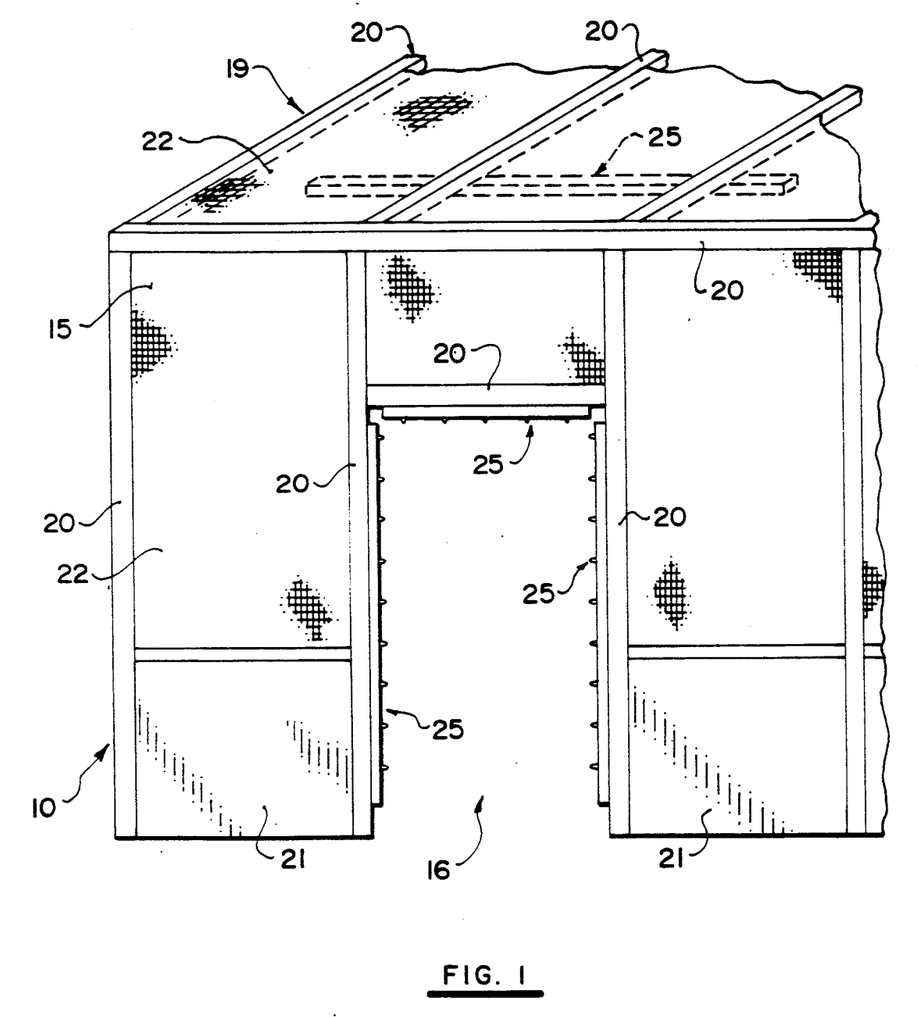
FIG. 1 is an isometric view showing a screen system defining a zone for separation from the remainder of building and including ionization generating elements mounted within the zone.
Figure 2:
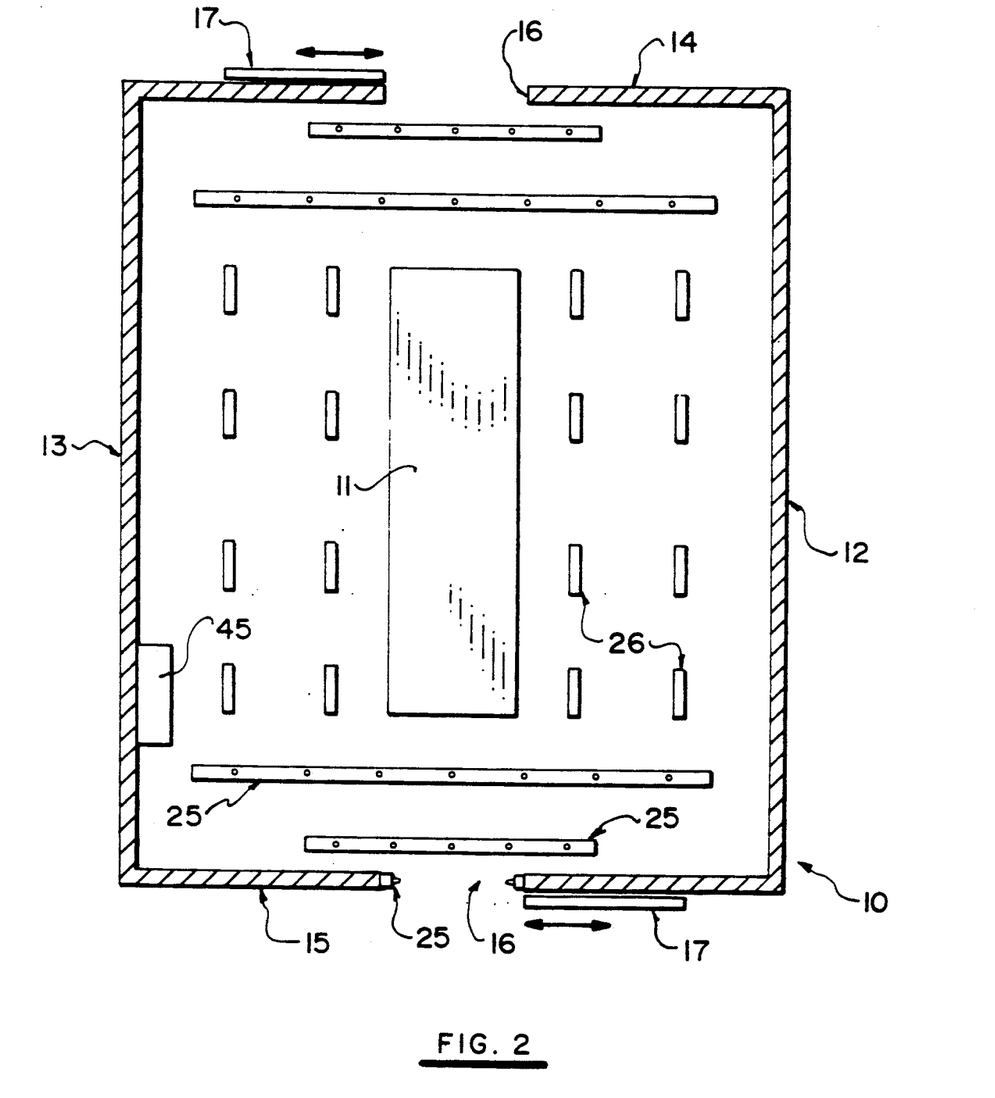
FIG. 2 is a top plan view of the zone of FIG. 1 showing the location of the ion emitters.

In FIGS. 1 and 2 is illustrated a zone defined by a surrounding wall structure generally indicated at 10 within which is mounted a machine 11 which is illustrated schematically and is wholly enveloped by the surrounding wall structure defining the zone.

The wall structure comprises two side walls 12 and 13 together with end walls 14 and 15 each of which includes an opening 16 and a slidable closing door 17. Across the top of the walls is provided a ceiling 19. The height of the walls is arranged to be approximately equal to the minimum working height of the order of eight feet and up to a maximum of the order of ten feet so that the ceiling 19 is generally positioned beneath the roof or ceiling structure of the building and is separate from the lighting, duct work and other utilities which are often provided in structural buildings of an industrial type.

This critical area or zone is enclosed using a slotted metal structure as the main supportive framework, housing panels covered with perforated screen material of a type which is permeable to air and light but is resistant to the passage of dust or other fine particles. One example of material which can be used is known as TAK Barrier Screening. The TAK Barrier Screening is a fine gauge fabric, treated with a special tacky resin. This Barrier screening is electronically compatible with negative ion presence and works harmoniously to create a dust free enclosure, trapping large particles, yet allowing the zone to breathe without any increase in air speeds across the fabric.

The enclosure which acts as a cage to isolate and define the area/volume required for the application is considered to be a basic and essential feature of the "clean zone" concept. The design, construction and materials employed, all contribute to ensuring the effectiveness of the system.

Installation is simple and flexible and easily fitted retroactively with the minimum difficulty to accommodate existing equipment.

The light open nature of the enclosure gives little sense of restriction to employees inside the zone and it is generally unnecessary to upgrade lighting levels in the area after the installation of the screens.

Strategically located emitters at ceiling level within the enclosure produces a bombardment of negative ions to precipitate particles inside the zone. At the same time a high density is created within the confines of the enclosure which will not allow particles to penetrate the screens, in either direction.

All openings into the zone required for access are protected by a curtain of ions which comprises a peripheral distribution of emitters to form an high density concentration of directed negative ions to precipitate any dust which might otherwise migrate into the area. Altogether a total screened, "cage" effect is produced with a fully isolated Clean Zone separate and distinct from the general working area of the facility.

On completion of a Clean Zone, and activation of the ion generation system, an ultra Clean Zone will be established for process within 24 hours. This protection will be available as long as the system is in operation with the necessary negative ions densities being maintained automatically at the proper levels.

The slotted steel frame work is indicated at 20 and is of a conventional nature available for receiving wall panels and for bug screens. A solid panel is indicated at 21 and the screen material is indicated at 22.

Figure 4:
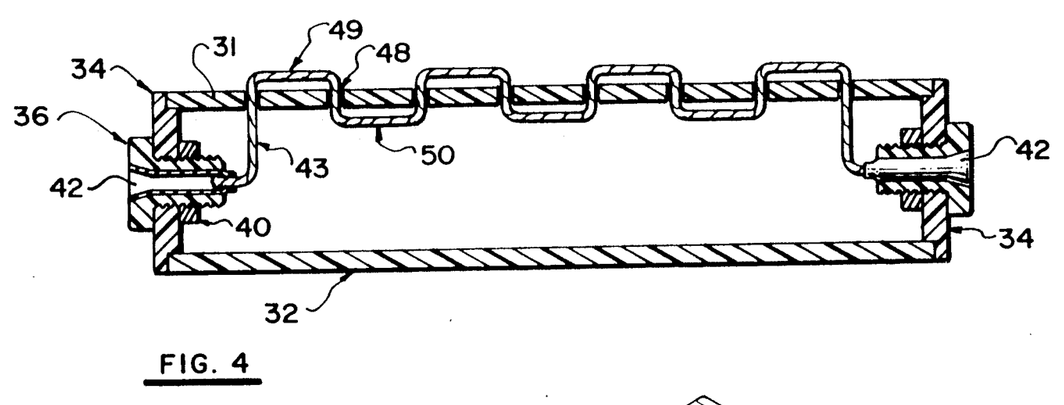
FIG. 4 is a cross-sectional view through an emitter element of a type shown schematically in FIGS. 1 and 2.
Figure 5:
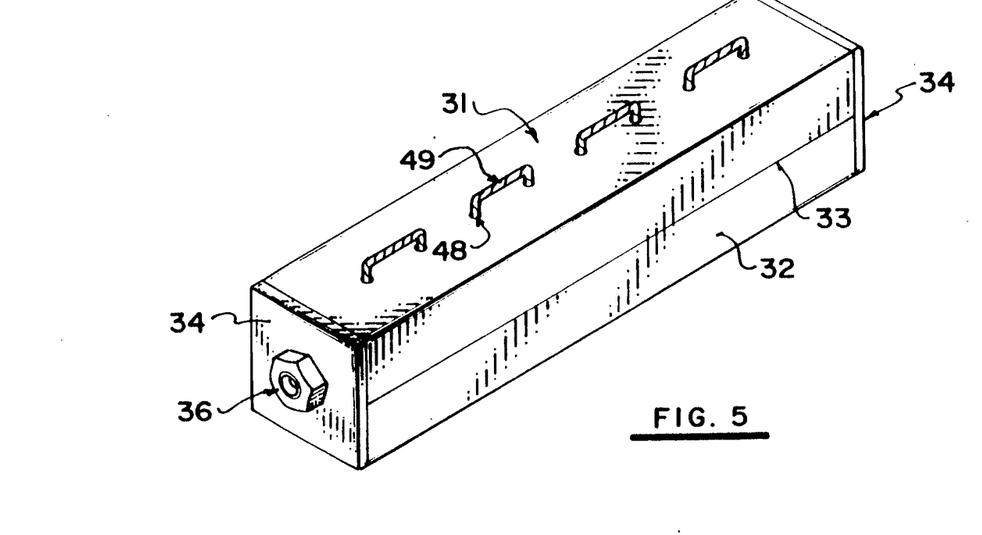
FIG. 5 is an isometric view of the emitter element of FIG. 4.

The ceiling is formed in the same structure employing wholly the screen material 22. The enclosure can thus be formed relatively simply by the assembly of the frame work following which the panels are simply flipped into place to define the completed zone. In FIGS. 1 and 2 there is provided a plurality of emitters of negative ions including two separate types of emitters indicated at 25 and 26 respectively. The details of the emitters 25 are shown in FIGS. 6 and 7 and the details of the emitters 26 are shown in FIGS. 4 and 5.

Figure 6:
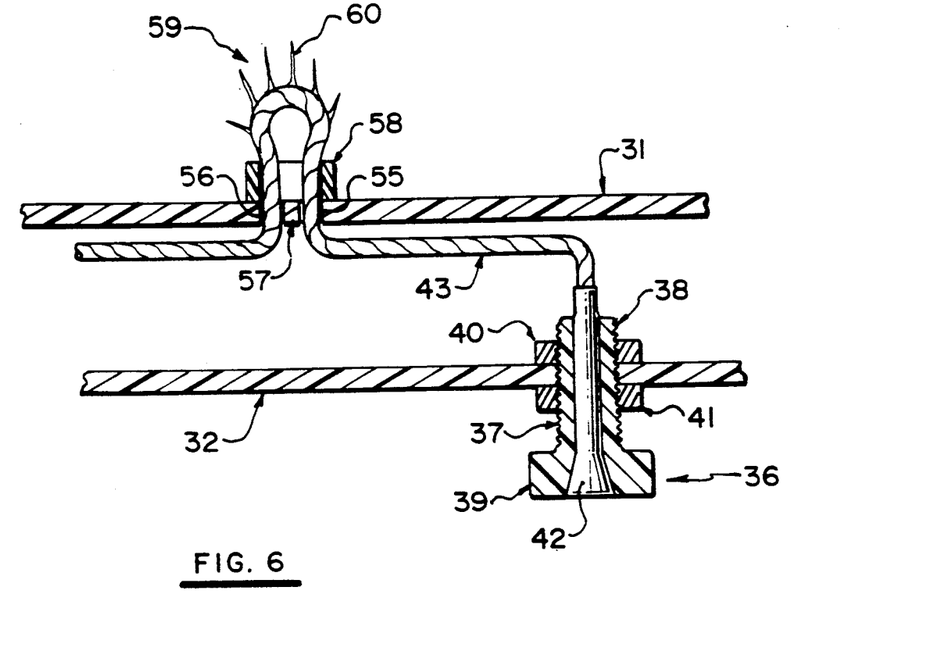
FIG. 6 is a cross-sectional view through a second emitter element of the type illustrated schematically in FIG. 1.
Figure 7:
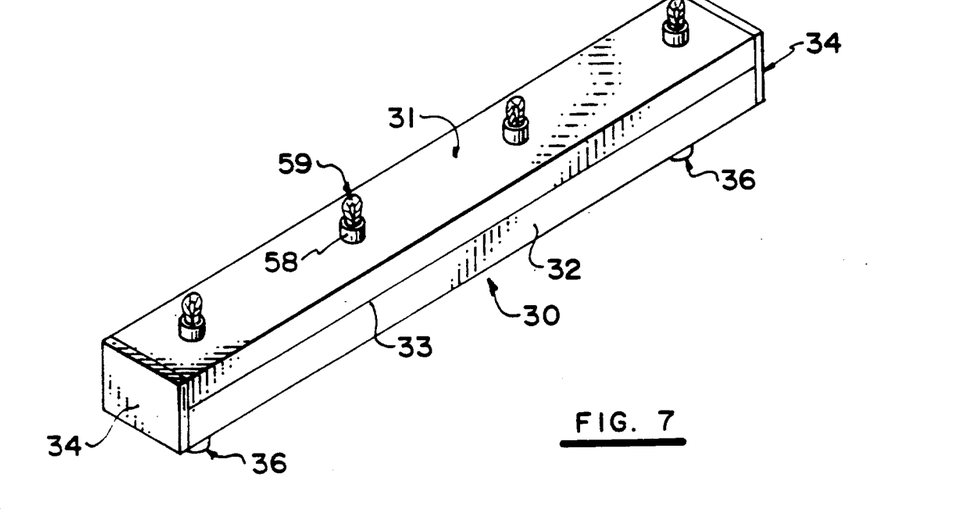
FIG. 7 is an isometric view of the emitter of FIG. 6.

Turning therefore to the emitters 25 shown in FIGS. 6 and 7, this emitter comprises an elongate channel member 30 formed in two halves 31 and 32 which are snap fit together along a joining line 33 to form an enclosed elongate tubular member. End caps 34 are provided of a type shown in FIG. 4 which comprise a press fit into the end of the tubular member thus forming a complete enclosure. The emitter 26 as shown in FIGS. 4 and 5 comprises the same basic housing structure. The length of the housing can be selected according to requirements as shown in FIGS. 4 and 5 the emitter is of a relatively short length whereas in FIG. 6 and 7 the emitter 25 can be significantly longer.

Each of the housings includes a connector 36 of a type including a body 37 which has an outer screw thread 38 and an end cap 39. The body can thus be attached through an opening in the housing simply by clamping into place by one or more nuts 40 and 41. In the arrangement shown in FIG. 6 there are two nuts provided each on a respective side of a wall of the housing so as to space the end cap 39 away from the wall. In the arrangement shown in FIG. 4, the end cap is clamped against the end face of the housing by the nut 40 on the opposed side of the wall of the housing. The housing includes a central bore which carries a conductor 42 and a volume of the sleeve which projects outwardly beyond the inner end of the body to connect to a conductor 43 provided within the housing. The tubular connector 42 is thus of a type which can receive simply a single pole connector by which high voltage from a generator 45 (FIG. 2) can be connected to the emitter with a plurality of emitters arranged in series by connection of a wire from each to the next.

The conductor 43 is formed of a yarn of a conductive fiber material for example carbon fibers which are cut into staple fibers and then spun and twisted to form a multi fold yarn. The housing is formed of very suitable insulating plastics material so that the conductor yarn can simply be threaded into the housing and can rest against the housing without forming a short circuit.

In FIGS. 4 and 5, a front face of the emitter which is defined by the upper face of the upper part 31 has a plurality of openings 48 substantially equidistantly spaced along the front face in a single line across the center of the front face. The yarn is then threaded simply in a stitch pattern so that portions of the yarn are exposed on the outer side of the front face and portions of the yarn are maintained on the inner side of the front face that is within the housing as indicated at 49 and 50 respectively.

This form of emitter is substantially multidirectional so that when a high voltage of the order of 6000 volts is applied to the conductor 43 the exposed portions 49 of the yarn generate a corona effect causing the creation of ions in the area of the corona effect with those ions tending to escape from the exposed portion of the yarn 49 in all directions away from the front surface. The ions thus tend to spread away from the emitter in all directions and to attach to particles within the air. As the particles are heavier than air the particles tend toward the ground surface and in view of the generally positive charge on the ground surface, the negatively charged particles are attracted to the ground surface and fall to the ground surface for collection on the ground surface both in view of gravity and in view of the electrostatic attraction.

As shown in FIG. 2, the emitters 26 are arranged in array around the center of the zone. In the example shown there are four rows of the emitters arranged substantially equadistantly spaced across the width of the zone. In this way the full area of the interior of the zone is bombarded with the ions which are spread equally throughout the central area of the zone. As shown in FIG. 1 the emitters 26 are mounted at the ceiling area on suitable supports (not shown). This places the height of the emitters generally at the height of the ceiling which would be in the order of eight to ten feet from the ground which has been found to be particularly effective since the ions are thus prevented from dissipation to other areas of the building before they can carry out their function of attachment to particles and transporting those particles to the ground surface.

The emitter 25 shown in FIGS. 6 and 7 is modified relative to the emitter 26 in that the conductor 43 is confined into short portions which project outwardly from the front face of the channel member 31. Thus the front face 31 includes for each portion a pair of holes 55 and 56 which are closely positioned together with only a narrow separating portion 57. The conductor is then threaded through the holes 55 and 56 and passes through a collar member 58 surrounding the holes and supporting the outerly projecting portion of the conductor 43 as indicated at 59. The collar member 58 can be bonded to the front surface of the channel member or can comprise a separately manufactured product which inserts from an underside of the upper surface of the channel member through a single hole in the wall 31 and provides by itself the proper support for the projecting portion 59.

The projecting portion 59 is confined to a short length of the front face of the channel member is caused to turn back upon itself at a sharp angle. This tends to cause individual ones of the staple fibers 60 to project outwardly from the yarn at the point where it is turned sharply thus forming a plurality of spikes which project outwardly from the sharply turned portion of the conductor 43. These spikes have been found to generate ions in a highly directional manner in that the ions are preferentially generated at the apex of the fiber spike and thus tend to be emitted in a direction generally at right angles to the front face.

The emitter 25 is therefore much more directional than the emitters 26. In view of this property, the emitters 25 are thus arranged to generate a curtain of ions lying in a plane longitudinal of the emitter 25 and at right angles to the front face.

Turning therefore to FIG. 1 the emitters 25 are mounted around the opening 16 along the sides of the opening and along the top of the opening with the emitters facing inwardly to generate a curtain across the plane of the opening of a high concentration of ions. This curtain acts to "attack" any dust particles attempting to pass through the opening so that those particles are acted upon quickly and tend quickly to fall to the ground at the area of the opening. As a back up for the emitters 25 at the opening, one or more rows of further emitters 25 can be positioned inwardly of the opening. Thus in FIG. 2 there are two further rows of emitters one positioned just inside the opening and the next behind the first thus forming three curtains of ions acting specifically on the dust tending to move through the opening carried by persons or equipment passing through that opening or by air movement through the opening.

The curtain of ions thus act at the openings in the zone and in addition the general level of ions within the zone acts in cooperation with the permeable tacky screen to cause dust and other particles to be collected at the screen rather than to pass through the screen. It has been noted that the ions have a tendency to act upon the dust just outside of the screen so that large quantities of particles fall to be collected on ground or other horizontal surfaces just outside the screen thus preventing the dust from passing through the screen.

Figure 3:
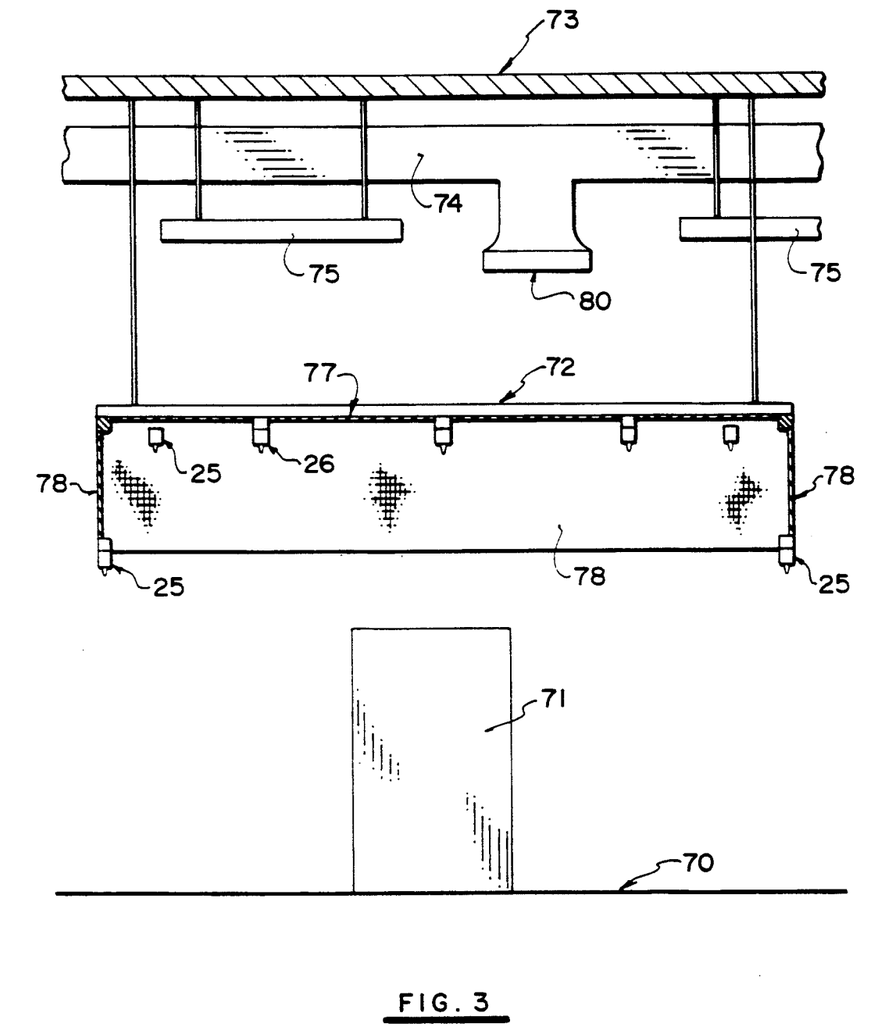
FIG. 3 is a cross-sectional view showing a modified arrangement of screen assembly defining a zone within a building.

As shown in FIG. 3 there is provided a modified arrangement including a floor surface 70, a machine 71, a screen 72, an upper ceiling 73 of the building and utilities including duct work 74 and lighting 75.

In this case the screen is modified in that it comprises simply a canopy supported from the ceiling or roof on support wires 76. The canopy includes a ceiling 77 formed in panels similar to the ceiling 19 together with four side wall portions 78 which hang down from the side edges of the ceiling. The details of the construction are not shown but are similar to that shown in FIG. 1. This of course leaves the side walls of the zone open for passage of persons or equipment but generates enough of a separation of the zone from the building to enable the cleaning of dust from around the machine 71. FIG. 3 also illustrates the arrangement in which the zone is separated from the ventilation systems including the duct work 74 and from the lighting systems which are maintained without modification in the building. The light into the zone is thus provided by the conventional lighting of the building. The ventilation or air movement within the zone is provided by the conventional building ventilation systems including the duct work 74 and a nozzle 80 which projects air to move downwardly through the screen and into the zone.

In the arrangement of FIG. 3, the dust is prevented from passing into the interior of the zone through the open side walls by the generation of a curtain of ions similar to that at the opening 16. Thus the emitters 25 are positioned so as to generate a curtain projecting downwardly at the open side walls and this can be backed up by one or more further rows of emitters 25 positioned inwardly of the side walls. Also similar to the construction shown in FIGS. 1 and 2, interior emitters can be of the type illustrated at 26 to generate a more even spread of ions throughout the zone.

In FIGS. 1 and 2 the machine 11 illustrated schematically comprises a machine for carrying out an industrial process of a type which requires very clean air for example a paint spraying machine or part molding machine so that this machine is maintained within a clean zone in which the dust in the remainder of the building is kept outside of the zone and is prevented from entering the zone and from remaining within the zone once it has entered. The clean zone must of course be backed up with good housingkeeping practices which will not be explained in detail here.

In the arrangement shown in FIG. 3, the zone is effectively a "reverse clean zone" in which the machine 71 is of a type which generates high levels of dust, for example a paper cutting machine or a textile spinning machine. In this case the machine itself is surrounded by a zone which protects the remainder of the building from receiving the high quantities of dust generated by the machine itself. In this way instead of maintaining the whole of the building cleaned, it is only necessary to clean the area surrounding the machine concerned so that the dust from that machine is prevented from escaping to the remainder of the building and is also contained within that area by the action of the negative ions on the dust particles and the tendency to precipitate and thus to collect on the ground surfaces from which they can be readily removed by normal housekeeping systems.

The emitters are entirely free from any forced air effect so that neither the ions nor any particle laden air passes through a filter. Thus the negatively charged ions collect onto the particles causing them to conglomerate and to precipitate onto the floor. The floor thus acts as a collector for the particles and this can be readily cleaned by conventional housekeeping practices. In addition, the tendancy of the particles at the area above the machine is to rise so that the bombardment of the particles in the air space of the canopy with the ions causes the particles to tend to flow outwards of the machine and to precipitate out onto the floor at the sides of the machine.

The details of the electrical equipment generating the high voltage are not shown as these are well known to one skilled in the art. In addition the wiring connections and the necessary conduit are not shown.

As an alternative arrangement for use in some building structures, the emitter 25 can be used at the exit nozzle of the ventilation duct work so that the ions are directed into the air stream which passes through the nozzle as the air emerges from the nozzle and is communicated into the building. The use of the emitters in the elongate or strip form enables the emitters to be tailored to the specific nozzles concerned by simply cutting to length or selection from a number of available lengths and attachment at the nozzle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of precipitating particles from air within a building comprising defining a zone within the building at least partly separated from a remaining part of the building, defining fixed partitions between the zone and the remaining part of the building which partitions are at least partly formed by a screen formed of a material which is perforated to allow transmission therethrough of air and light, and mounting within the zone a plurality of emitters of negatively charged ions so as to precipitate the particles downwardly onto a floor of the zone.

2. The method according to claim 1 wherein the emitters are mounted in an array within the zone, at least some of the emitters being separated from any air movement devices.

3. The method according to claim 1 wherein the building includes ventilation systems for introduction of air into the building. the ventilation system being separate from the emitters.

4. The method according to claim 3 wherein the ventilation system is positioned outside of the zone so that air movement within the zone is obtained by passage of air through the screen.

5. The method according to claim 1 wherein the screen has at least one opening therein to allow passage therethrough of persons and/or equipment and wherein there is provided a plurality of emitters arranged in a row at the opening so as to generate a curtain of ions.

6. The method according to claim 5 including a second row of emitters parallel to the row at the opening so as to define a second curtain of ions.

7. An emitter of negatively charged air ions for use in precipitating particles from air within a building comprising a rigid elongate channel member defining a hollow interior extending therealong and having a closed front surface, a continuous fibrous conductor mounted in the channel member rearwardly of the front surface and extending along the channel member, means defining a plurality of openings in the front surface through which portions of the fibrous conductor project, and connector means on the channel member for connecting a high voltage to the conductor such that the exposed portions of the conductor generate ions in air exposed to the conductor forwardly of the front surface.

8. The emitter according to claim 7 wherein the conductor comprises a yarn formed from a conductive fibrous material.

9. The emitter according to claim 7 wherein the channel member includes end closure members so that the channel member is fully closed except for said openings and wherein the connector means includes first and second connector terminals each mounted on a respective one of the end closure members.

10. The emitter according to claim 7 wherein each conductor portion forms one of a plurality of loops projecting outwardly from the front surface of the channel member.

11. The emitter according to claim 10 wherein each loop comprises a portion of yarn which is sharply angled back upon itself to define a sharp turn in the yarn leaving a plurality of fibers exposed at the sharp turn.

12. The emitter according to claim 11 including a collar member surrounding the loop of yarn and supporting it so as to project outwardly from the front surface of the channel member.

* * * * *